Oct. 30, 1945.   D. P. BERNHEIM ET AL   2,388,205
EYE PROTECTION MEANS
Filed Dec. 14, 1942   2 Sheets-Sheet 1
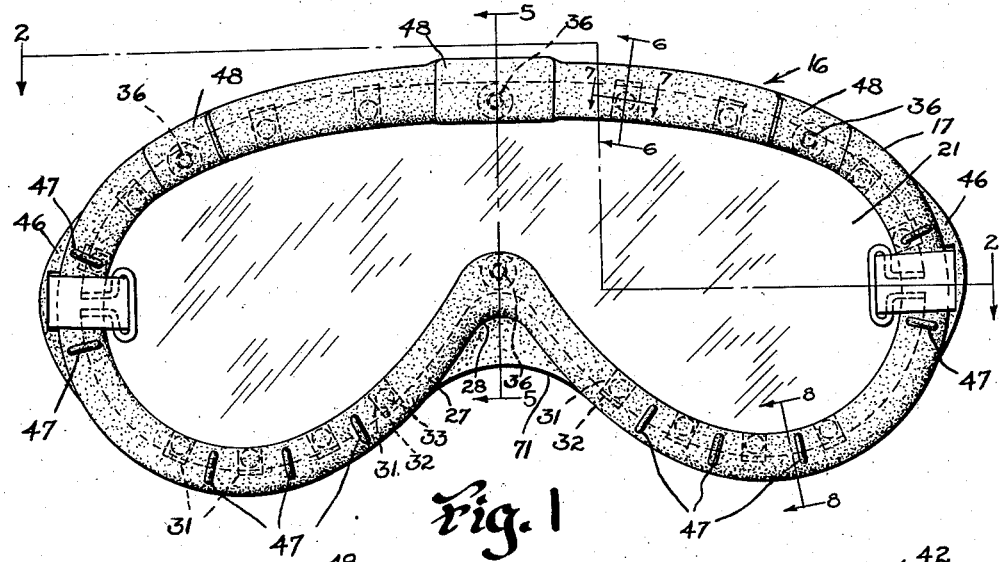
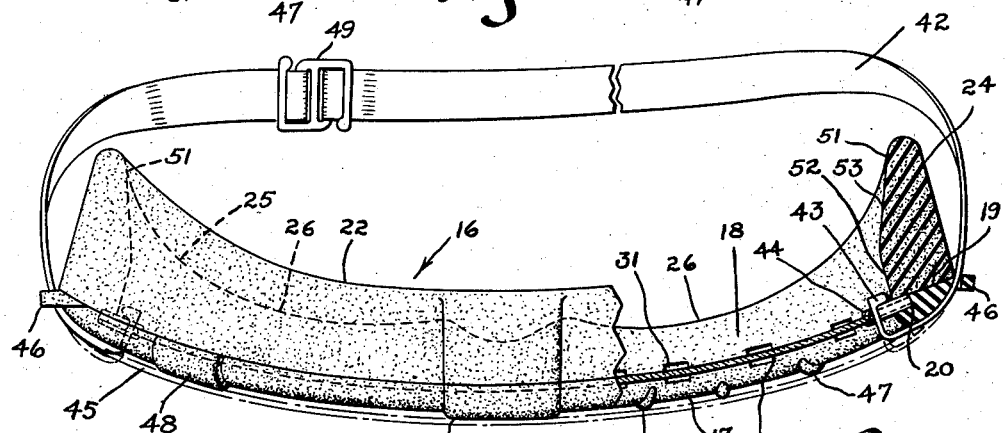
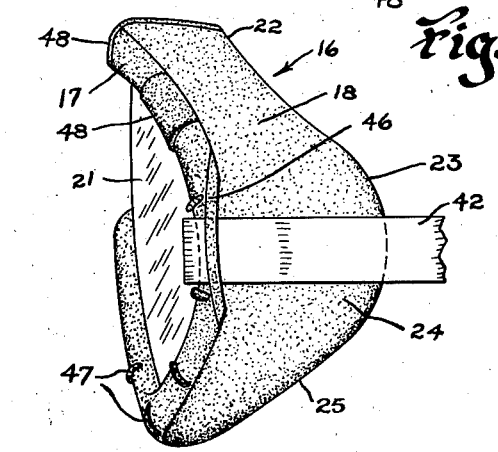
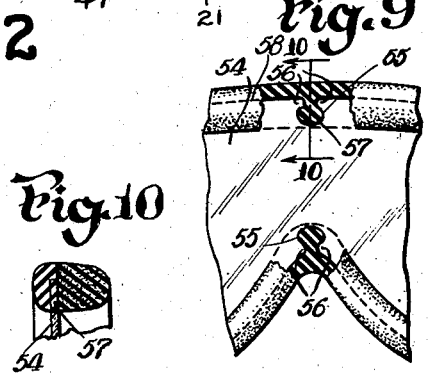
INVENTORS
DANIEL P. BERNHEIM
EDWARD M. SPLAINE
WILLIAM H. LEHMBERG
WALTER LOWN
CHARLES A. BARATELLI
BY Louis L. Gagnon — ATTORNEY Oct. 30, 1945.    D. P. BERNHEIM ET AL    2,388,205
EYE PROTECTION MEANS
Filed Dec. 14, 1942    2 Sheets-Sheet 2
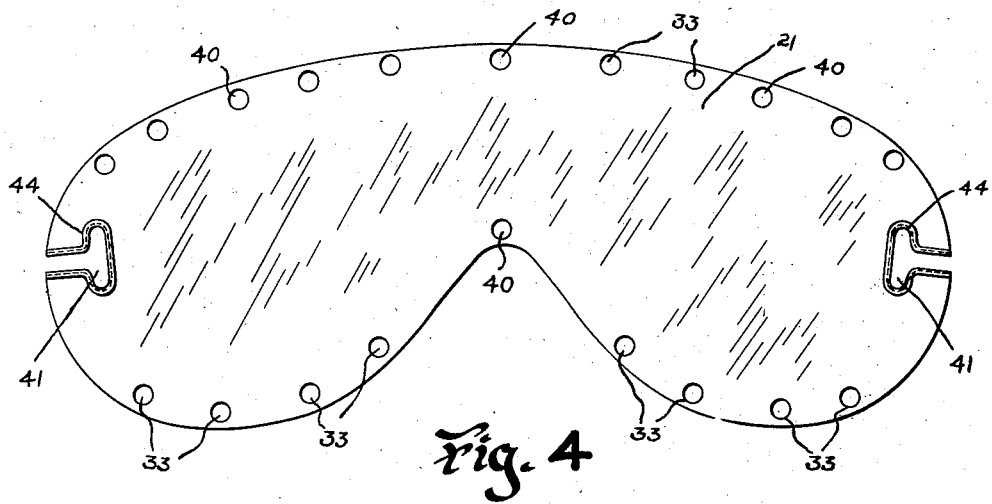
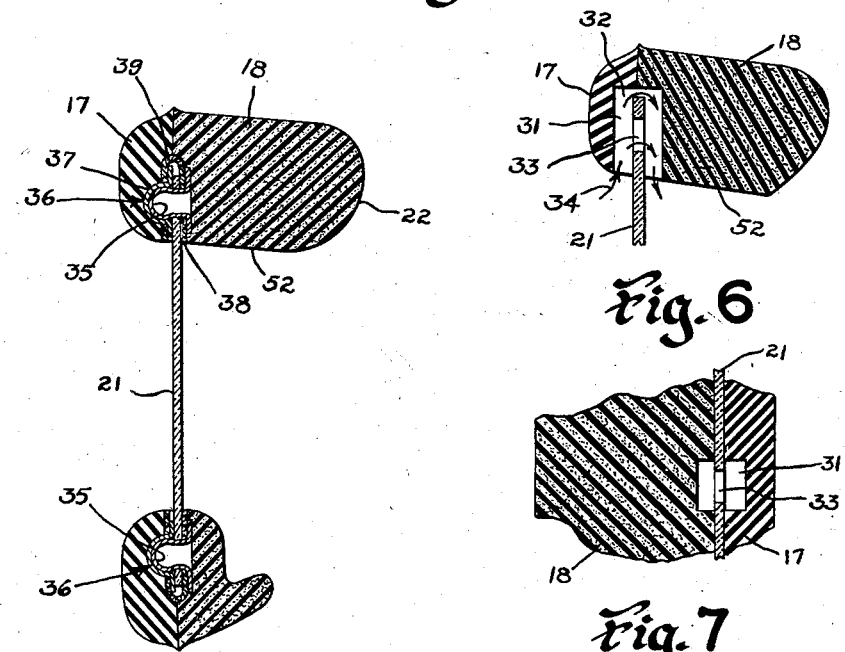
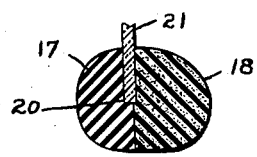
INVENTORS
DANIEL P. BERNHEIM
EDWARD M. SPLAINE
WILLIAM H. LEHMBERG
WALTER LOWN
CHARLES A. BARATELLI
BY
ATTORNEY.

Patented Oct. 30, 1945

2,388,205

UNITED STATES PATENT OFFICE 2,388,205

EYE PROTECTION MEANS

Daniel P. Bernheim and Edward M. Splaine, Southbridge, William H. Lehmberg, Newton, Walter Lown, Boston, and Charles A. Baratelli, Cambridge, Mass., assignors to American Optical Company, Southbridge, Mass., a voluntary association of Massachusetts Application December 14, 1942, Serial No. 469,020

4 Claims. (Cl. 2—14)

This invention relates to improvements in eye protection means and has particular reference to novel means of forming such means.

One of the principal objects of the invention is to provide novel means of forming a protection goggle of the type adapted for general utility and being so fabricated as to have an inherent comfortable fit with the facial characteristics of most individuals and which will afford ease of interchanging of lenses and embody a minimum of parts.

Another object is to provide an eye protection device having a facepiece formed substantially entirely of resilient material with a part of said material having more yielding characteristics and having a face formed portion shaped to the major facial requirements of the average run of individuals and being readily compressible and self-shaping to obtain an intimate fit with irregularities of facial contour.

Another object is to provide a facepiece for an eye protection device of the above character formed essentially of resilient material with the part of said facepiece opposed to the face engaging portion being formed more rigid to form a framing for the lens which, through its more rigid characteristics, will tend to yieldingly retain the eye protection device in the initial shape to which it is formed.

Another object is to provide an eye protection device of the above character with novel ventilating means.

Another object is to provide an eye protection device with novel headband attaching means.

Another object is to provide an eye protection device of the above character with novel means of retaining the lens in the lens receiving groove of the said device.

Another object is to provide an eye protection device of the above character with a relatively shallow lens supporting frame of resilient material shaped to inherently have a relatively intimate fit with the face and to position the lens of the device relatively close to the eyes so as to afford an extremely wide field of vision when in position of use on the face.

Another object is to provide an eye protection device and novel means of forming the same whereby the said device may be simply and economically manufactured and will be composed of a minimum of parts which may be quickly and easily assembled to complete the device.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims. We, therefore, do not wish to be limited to the exact details of construction and arrangement of parts shown and described as the preferred forms only have been given by way of illustration.

Referring to the drawings:

Fig. 1 is a front view of the eye protection device embodying the invention;

Fig. 2 is a plan view partially in section of the device illustrated in Fig. 1;

Fig. 3 is a side elevational view of said device;

Fig. 4 is a front view of the lens;

Fig. 5 is an enlarged sectional view taken as on line 5—5;

Fig. 6 is an enlarged fragmentary sectional view taken as on line 6—6 of Fig. 1;

Fig. 7 is an enlarged fragmentary sectional view taken as on line 7—7 of Fig. 1 and in a direction substantially normal to section 6—6;

Fig. 8 is an enlarged fragmentary sectional view taken as on line 8—8 of Fig. 1;

Fig. 9 is a fragmentary front view shown partially in section of a modified form of the invention;

Fig. 10 is a fragmentary enlarged sectional view taken as on line 10—10 of Fig. 9.

It has been usual, in the past, to provide eye protection goggles for specific and restricted uses depending upon the particular hazards encountered.

Such practice, therefore, resulted in a number of different eye protection devices which were only suitable for said specific uses. This was due primarily to the fact that while a particular eye protection device or goggle met the requirements of some uses they were entirely impractical or inadequate for other specific uses. It, therefore, is one of the primary objects of this invention to provide a goggle or eye protection device having features embodied therein for rendering said protection device adaptable for general utility thereby obviating the necessity of having a plurality of different type goggles.

It is also another primary object of the invention to provide a goggle of the above character which is simple in construction, inexpensive to manufacture, which will require a minimum of time in assembling the parts and which will afford maximum protection in a wide variety of uses.

Referring more particularly to the drawings wherein like characters of reference designate like parts throughout the several views the device embodying the invention comprises a face piece 16 comprising a frame-like portion 17 of resilient material such as rubber, latex, rubber latex, vinyl chloride, ethyl cellulose plasticized with castor oil or other suitable plasticizer or other known synthetic rubbers or other means having similar characteristics. The frame-like member 17 is formed of relatively hard material of the above nature and has secured thereto, by vulcanizing or other suitable means, a face engaging portion 18 formed of any one or more of the various materials set forth above but which has the characteristics of sponge rubber thereby being more resilient than the frame-like portion 17. The portion 18 is secured to the frame-like portion 17, as illustrated at 19, by vulcanizing or by the use of suitable cements, such as latex cement or cements having similar characteristics. The portion 17 is formed with an internal shouldered edge 20 which, when said portion 17 is secured to the portion 18, provides a continuous slot or groove throughout the frame-like portion 17 for receiving the edge of the lens 21. The lens 21 may be formed of any suitable transparent material and is preferably formed of any one of several known transparent artificial resins, such as methyl methacrylate or may be formed of glass, Celluloid or the like. The lens 21 is placed within the lens retaining groove or slot by distorting the material of the frame-like portion 17 and face engaging portion 18 and by allowing the said material to return to its initial set after the lens has been placed within the slot or groove. The face engaging portion 18 has an upper contour edge 22 shaped to the general contour characteristics of the forehead adjacent the brow. The edge 22 curves outwardly and rearwardly and blends with the contour edge 23 of the side portions 24 of the facepiece. The edge 23 is shaped to fit the general contour of the temporal sides of the face adjacent the outer orbital brims of the eyes. The face engaging edge continues downwardly and inwardly, as illustrated at 25 in Fig. 3, and at 25 in Fig. 2, and blends with the lower contour edges 26 of the facepiece which are shaped to fit the general contour shape of the cheekbones below the eyes. The facepiece 18, as illustrated at 27 in Fig. 1, is shaped to provide a nasal recess 28, shaped to fit the general contour characteristics of the bridge of the nose. In order to insure a more intimate seal adjacent the nose the facepiece is provided with a relatively thin integral web 71 of relatively soft resilient material simulating the material of the portion 18. The complete face engaging portion of the member 18, therefore, is initially shaped to fit the general facial characteristics of most individuals throughout the contour of the eyes. The lens receiving slot or groove resulting from the shouldered portion 20 is provided, at spaced intervals, with a plurality of recesses 31, illustrated by the dash lines in Fig. 1, and in cross-section in Figs. 6 and 7. As shown in Figs. 6 and 7, the recesses 31 are considerably wider than the width of the slot for receiving the lens and extend below or above the base of the lens receiving slot as illustrated at 32. This provides a clearance between the base of each recess 31 and the adjacent edge of the lens whereby air entering the recess 31 from the front of the lens may pass through the space 32 inwardly of the facepiece 18 to the rear side of the lens. To insure more positive ventilation the lens 21 is provided with openings 33 spaced a distance apart substantially equal to the distance between the corresponding recesses. Air entering the recesses 31, as indicated by the plurality of arrows 34 in Fig. 6, will pass about the edge of the lens through the space 32 and will also pass through the openings 33 in the lens. There are additional openings in the lens simulating the openings 33 which are adapted to fit over the male portions 35 of suitable snap fasteners or the like 36, see Figs. 1 and 5. The male portions 35 are secured to and carried by the facepiece 18. Each snap fastener also has a female portion 37 carried by the frame-like member 17. Each of said male and female portions are carried by a web 38 which assists in retaining the said male and female portions in proper aligned relation with each other and also aid in attaching the said portions to the facepiece. The attachment may be through the use of suitable latex cement or other suitable means. It is to be noted that the web 38 forms a hingle-like portion 39 which, when the female member is snapped free from the male member 35, permits the lower edge of the groove portion of the frame-like member 17 along with said female portion to be twisted in an outward direction to permit the portion of the lens 21 having the connection opening therein to be fitted over the male member and the lens to be secured inwardly of the lens re-retaining slot or groove at the location of each of the respective snap fasteners 36. The openings which are preferably used as attachment openings are illustrated at 40 respectively in Fig. 4.

The lens 21, in order to provide headband attachment means, is provided with T-shaped slots 41 on the opposed sides thereof. The slots are preferably formed T-shaped in order to afford ease in attaching the headband 42 thereto. The headband 42 has enlarged portions 43 adjacent the ends thereof attached to the T slots and are located in the T slot by threading the same inwardly of the T-shaped slot from the open side thereof.

In order to reinforce the T-shaped slotted portions the edges of said slotted portions are provided with a metal binding or an integral bead or the like 44.

In order to retain the ends 43 in proper fitted relation in the T-shaped slots 41 and to aid in preventing the facepiece 16 of the goggle from rotating or tilting forwardly or rearwardly when suspended by the headband the facepiece is provided, on the temporal sides thereof, with slotted integral portions 46 through which the headband 42 is threaded.

This causes the facepiece to be of greater gravital weight below a horizontal suspension line extending through the integral slotted portions 46 thereby preventing the said facepiece from tilting forwardly and rearwardly relative to the headband when suspended by said headband. The slotted portions 46, as shown in Fig. 2, also aid in retaining a cover glass or the like 45, as illustrated by the dot and dash lines, in relatively intimate relation with the front of the facepiece. This is because of the fact that the slotted ends of the cover glass are retained between the anchored ends 43 and the portions threaded through the slots 46.

The member 45, although termed a cover glass, is preferably formed essentially of the same material as the main lens portion 21 and is provided with slots adjacent the opposed sides thereof through which the headband 42 is threaded in a manner simulating the connection of said headband with the main lens 21. The cover glass may be an auxiliary protection lens used jointly with the lens 21, which may be of a different color or of different light absorptive characteristics than the main lens portion as to infra-red or ultraviolet rays or may be formed of material possessing light-polarizing characteristics. Such polarizing material may be any of the light-polarizing materials sold under the trade-name "Polaroid."

The framing 17 is provided with a plurality of integral lugs or spacer members 47 and 48 on the face thereof to provide ventilation between the cover glass and said framing.

The facepiece 18, in its function of compensating for slight irregularities in the facial contours of different individuals, has a tendency to compress in the direction of the thickness of the material as distinguished from most prior art facepieces which have a tendency to roll or bend under pressure introduced by the pull of the headband. The sponge rubber face engaging portion 18, when the face engaging edge engages the face, is initially fitted to the general facial contours and compresses to compensate for slight irregularities in the face. This altering changes the distance between said face engaging edge and the line of the plane of the lens when compensating for said irregularities.

It is to be noted, however, that the facepiece 18 in its entirety is such that it has edge contact with the face throughout the lower and upper contour edges 22 and 26 respectively thereof, which edges are at a relatively short distance from the plane of the lens as compared with the side portions 24. The side portions 24 have substantially side surface contact with the sides of the face which is indicated by the reference numeral 51 in Fig. 2. The side portions 24 extend rearwardly of the lenses a distance considerably greater than the distance between the edge 22 and the plane of the lens. The edge 22, however, is at a greater distance from the plane of the lens than the lower edge 26. This causes the lens to tilt forwardly on the nose with the lower edge of the lens being closer to the eyes than said upper edge when the device is in position of use on the face. This is best shown in Figs. 2 and 5.

The facepiece is in the form of continuous eyecup members shaped to fit intimately with the face throughout the entire contour edge of the lens with the lens being formed of continuous sheet material. In order to insure a wide field of vision throughout said facepiece the inner walls 52 are angled outwardly with respect to the inner wall 53 thereof throughout the upper portion and sides of the facepiece. The angle of the inner surface 52, throughout the upper portion of the facepiece, is best illustrated in Figs. 5 and 6. In view of the fact that the lower contour portions of the facepiece are relatively narrow, such angling of the wall is not necessary.

In Fig. 9 there is illustrated a modification of the invention in which the lens 54, which simulates the lens 21, is provided with vertically disposed notches 55 with the forward ends 56 of said notches being contracted to provide ears for engagement with the integral webs 57 which span the lens groove 58 and are integrally joined with the opposed portions of the facepiece which overlie the opposite sides of the lens. This forms a dove-tail like connection between the facepiece and the lens along the vertical center line of the eye protection device.

When assembling the lens with the facepiece the notches 55 are interlocked with the webs 57 through the resiliency of said webs. The webs 57 are formed of resilient material similar to that of the facepiece and are formed to such initial dimension as to require compression of the material of the web during the insertion thereof of the notches 55. This interlocks the facepiece with the lens at the center of the protection device.

Although it is preferable that the facepiece be formed with a front frame-like portion of resilient material inherently harder than the rear face engaging portion thereof, as shown throughout the various views, the front frame portion may be formed of material other than rubber and may be formed relatively rigid and yet accomplish the results desired. In this particular instance, the lens would be inserted in the lens receiving groove by distorting the inner portion of the facepiece. It is preferable, however, that the front frame-like portion 17 be formed of material having distortable characteristics.

From the foregoing description it will be seen that simple, efficient and economical means have been provided for accomplishing all of the objects and advantages of the invention.

Having described our invention, we claim:

1. A device of the character described comprising a single aperture facepiece of flexible and resilient material adapted to fit about the eyes of the wearer, a single lens for said aperture, a groove in said facepiece to receive the peripheral edge of the lens, releasable fastener elements carried by the facepiece and extending into said groove to engage the lens, and a plurality of spaced recesses in the walls of said groove open to the interior of the facepiece, with the walls of said recesses spaced away from the sides of the lens and also from the edge thereof, whereby air may enter said recesses at one side of the lens and pass about the edge of the lens into the facepiece when in position of use on the face.

2. A device of the character described comprising a single aperture facepiece of flexible and resilient material adapted to fit about the eyes of the wearer, a single lens for said aperture, a groove in said facepiece to receive the peripheral edge of the lens, releasable fastener elements carried by the facepiece and extending into said groove to engage the lens, a plurality of spaced recesses in the walls of said groove open to the interior of the facepiece, with the walls of said recesses spaced away from the sides of the lens, and openings in the lens located within said recesses, whereby air may enter said recesses at one side of the lens and pass through said openings in the lens and into the facepiece when in position of use on the face.

3. A device of the character described comprising a single aperture facepiece of flexible and resilient material adapted to fit about the eyes of the wearer, a single lens for said aperture, a groove in said facepiece to receive the peripheral edge of the lens, releasable fastener elements carried by the facepiece and extending into said groove to engage the lens, a plurality of spaced recesses in the walls of said groove open to the interior of the facepiece, with the walls of said recesses spaced away from the sides of the lens and also from the edge thereof, and openings in the lens located within said recesses, whereby air may enter said recesses at one side of the lens and pass about the edge of the lens and through said openings in the lens into the facepiece when in position of use on the face.

4. A device of the character described comprising a single aperture facepiece of flexible and resilient material adapted to fit about the eyes of the wearer and having a groove for receiving the peripheral edge of a lens, a single lens releasably mounted in said groove, and a plurality of spaced recesses in the walls of said groove open to the interior of the facepiece, with the walls of said recesses spaced away from the sides of the lens and also from the edge thereof, whereby air may enter said recesses at one side of the lens and pass about the edge of the lens into the face piece when in position of use on the face.

DANIEL P. BERNHEIM.
EDWARD M. SPLAINE.
WILLIAM H. LEHMBERG.
WALTER LOWN.
CHARLES A. BARATELLI.